US008460509B2

(12) United States Patent
Lakatos et al.

(10) Patent No.: US 8,460,509 B2
(45) Date of Patent: *Jun. 11, 2013

(54) WATER EVAPORATION SYSTEM AND METHOD

(75) Inventors: Janos I. Lakatos, Mendon, UT (US); Edward Clay Slade, North Logan, UT (US); Clayton R. Carter, North Logan, UT (US)

(73) Assignee: Total Water Management, LLC, Salt Lake City, UT (US)

(*) Notice: Subject to any disclaimer, the term of this patent is extended or adjusted under 35 U.S.C. 154(b) by 750 days.

This patent is subject to a terminal disclaimer.

(21) Appl. No.: 12/029,377

(22) Filed: Feb. 11, 2008

(65) Prior Publication Data

US 2009/0199972 A1 Aug. 13, 2009

(51) Int. Cl.

| | |
|---|---|
| ***C02F 1/12*** | (2006.01) |
| ***B01D 1/14*** | (2006.01) |
| ***B01D 1/16*** | (2006.01) |

(52) U.S. Cl.

USPC .......... 159/47.3; 159/16.1; 159/38; 159/4.01; 159/41; 159/44; 159/48.1; 159/DIG. 15; 55/447; 202/166; 202/197; 202/236; 202/266; 202/267.1; 203/1; 203/10; 203/39; 203/49; 203/86; 203/88

(58) Field of Classification Search

USPC .................... 159/16.1, 38, 40, 41, 4.01, 4.02, 159/4.06, 44, 47.3, 48.1, DIG. 15; 55/447; 202/166, 197, 236, 266, 267.1; 203/1, 10, 203/39, 49, 86, 88

See application file for complete search history.

(56) References Cited

U.S. PATENT DOCUMENTS

| | | | | | |
|---|---|---|---|---|---|
| 1,502,911 | A | * | 7/1924 | Doern | 159/4.01 |
| 2,268,871 | A | * | 1/1942 | Hall | 159/4.07 |
| 2,825,680 | A | * | 3/1958 | Stutz | 202/200 |
| 3,703,917 | A | * | 11/1972 | Mundy | 83/867 |
| 3,771,289 | A | * | 11/1973 | Skoli et al. | 96/228 |
| 3,780,786 | A | * | 12/1973 | Pacault et al. | 159/4.02 |

(Continued)

FOREIGN PATENT DOCUMENTS

| | | |
|---|---|---|
| EP | 1 621 520 A1 | 2/2006 |
| JP | 6-218357 | 8/1994 |

(Continued)

OTHER PUBLICATIONS

International Search Report dated Aug. 12, 2011, issued in PCT/US2010/59941.

(Continued)

*Primary Examiner* — Virginia Manoharan
(74) *Attorney, Agent, or Firm* — Workman Nydegger

(57) ABSTRACT

A fluid evaporation system includes a housing bounding a fluid reservoir and an air flow path that is disposed over top of the fluid reservoir. The housing has an inlet opening and a spaced apart outlet opening that both provide communication between the outside environment and the air flow path. A fan is positioned to draw the air out of the air flow path through the outlet opening. A baffle projects into the air flow path at a location between inlet opening and the outlet opening so as to constrict the area of the air flow path thereat. A plurality of spray nozzles are positioned within air flow path between the baffle and the first end of the housing. A pump is configured to draw fluid from the reservoir and deliver it to the plurality of spray nozzles.

24 Claims, 12 Drawing Sheets

U.S. PATENT DOCUMENTS

| | | | | |
|---|---|---|---|---|
| 3,939,036 | A | 2/1976 | Erwin | |
| 4,371,434 | A | 2/1983 | Clarke | |
| 4,409,064 | A | 10/1983 | Vora et al. | |
| 4,437,867 | A | 3/1984 | Lerner | |
| 4,473,438 | A * | 9/1984 | Loureiro | 159/4.02 |
| 4,479,486 | A | 10/1984 | Manning et al. | |
| 4,534,828 | A * | 8/1985 | Erickson et al. | 159/16.1 |
| 4,564,457 | A | 1/1986 | Cairo et al. | |
| 4,713,172 | A | 12/1987 | Horn et al. | |
| 5,082,525 | A | 1/1992 | Travis | |
| 5,192,517 | A | 3/1993 | Spink | |
| 5,209,821 | A * | 5/1993 | Shaw et al. | 159/16.1 |
| 5,227,018 | A * | 7/1993 | Bro et al. | 159/4.02 |
| 5,240,560 | A | 8/1993 | Gregory | |
| 5,272,820 | A * | 12/1993 | Ito et al. | 34/585 |
| 5,335,728 | A | 8/1994 | Straham | |
| 5,381,742 | A | 1/1995 | Linton et al. | |
| 5,582,680 | A | 12/1996 | Vankouwenberg et al. | |
| 6,187,206 | B1 | 2/2001 | Bernier et al. | |
| 6,190,498 | B1 | 2/2001 | Blagborne | |
| 6,200,428 | B1 | 3/2001 | VanKouwenberg | |
| 6,272,876 | B1 * | 8/2001 | Roberts et al. | 62/255 |
| 6,637,379 | B2 | 10/2003 | Hays et al. | |
| 7,251,939 | B2 | 8/2007 | Walker | |
| 2002/0178723 | A1 | 12/2002 | Bronicki et al. | |
| 2004/0086816 | A1 | 5/2004 | Hays et al. | |
| 2005/0194323 | A1 | 9/2005 | Ruth et al. | |
| 2006/0000355 | A1 | 1/2006 | Ogura et al. | |
| 2007/0084778 | A1 | 4/2007 | St.Germain et al. | |
| 2007/0227674 | A1 | 10/2007 | Haslem et al. | |
| 2007/0235146 | A1 | 10/2007 | Haslem et al. | |
| 2007/0246414 | A1 | 10/2007 | Page et al. | |
| 2010/0044322 | A1 | 2/2010 | Fujisato et al. | |
| 2011/0139378 | A1 | 6/2011 | Lakatos et al. | |
| 2011/0140457 | A1 | 6/2011 | Lakatos et al. | |

FOREIGN PATENT DOCUMENTS

| | | |
|---|---|---|
| JP | 7-88469 | 4/1995 |
| JP | 2006-7097 | 1/2006 |
| WO | 2008/112793 A1 | 9/2008 |

OTHER PUBLICATIONS

Written Opinion issued dated Aug. 12, 2011, issued in PCT/US2010/59941.

International Search for PCT/US2010/59941, dated Apr. 1, 2011.

Final Office Action issued Aug. 17, 2011 in U.S. Appl. No. 12/029,377, filed Feb. 11, 2008.

Notice of allowance issued in U.S. Appl. No. 12/965,621 on Apr. 2, 2012.

Office Action dated Apr. 1, 2013, issued in U.S. Appl. No. 12/965,598, filed Dec. 10, 2010.

* cited by examiner

WATER EVAPORATION SYSTEM AND METHOD

CROSS-REFERENCE TO RELATED APPLICATIONS

Not applicable.

BACKGROUND OF THE INVENTION

1. The Field of the Invention

The present invention relates to water evaporation systems and, more particularly, transportable, water evaporation systems used for disposing of waste water from oil and gas wells.

2. The Relevant Technology

As natural gas is extracted from a ground well, a significant quantity of water accompanies the natural gas. This water is typically separated from the natural gas at a location proximate to the well head and then stored in an adjacent tank. Because of contaminants within the water, the water is typically trucked to a licensed disposal facility where it is deposited in a lined pond for evaporation. This same operation also typically occurs in the production of oil wells. That is, a significant quantity of water will often accompany extracted oil. The water and oil are deposited in a settling tank where the water and oil are separated. The water is then typically trucked to a licensed disposal facility where it is deposited in a lined pond for evaporation. Evaporation of the collected water is typically enhanced by sprinkler systems that spray the water into the air over the pond.

Although the above process is functional, there are significant costs in having to repeatedly ship the water to the disposal facility. There are also significant costs charged by the disposal facility to accept the water. Furthermore, trying to dispose of water through an evaporation pond can be problematic. For example, under windy conditions the sprinkler system cannot be operated due to the risk of non-evaporated fluid being carried by the wind onto the surrounding area. Furthermore, during colder or high humidity conditions, evaporation may fall below a desired evaporation rate.

Accordingly, what is needed are systems that eliminate or minimize the above problems or shortcomings.

BRIEF DESCRIPTION OF THE DRAWINGS

Various embodiments of the present invention will now be discussed with reference to the appended drawings. It is appreciated that these drawings depict only typical embodiments of the invention and are therefore not to be considered limiting of its scope.

DETAILED DESCRIPTION OF THE PREFERRED EMBODIMENTS

The present invention relates to water evaporation systems. Although the water evaporation systems can be used in a variety of different situations where it is desirable to evaporate a large quantity of water into the surrounding environment, the present invention will most commonly be used in association with the oil and gas industry. For example, depicted in FIG. 1 is one embodiment of a water evaporation system 10 incorporating features of the present invention.

Figure 1:
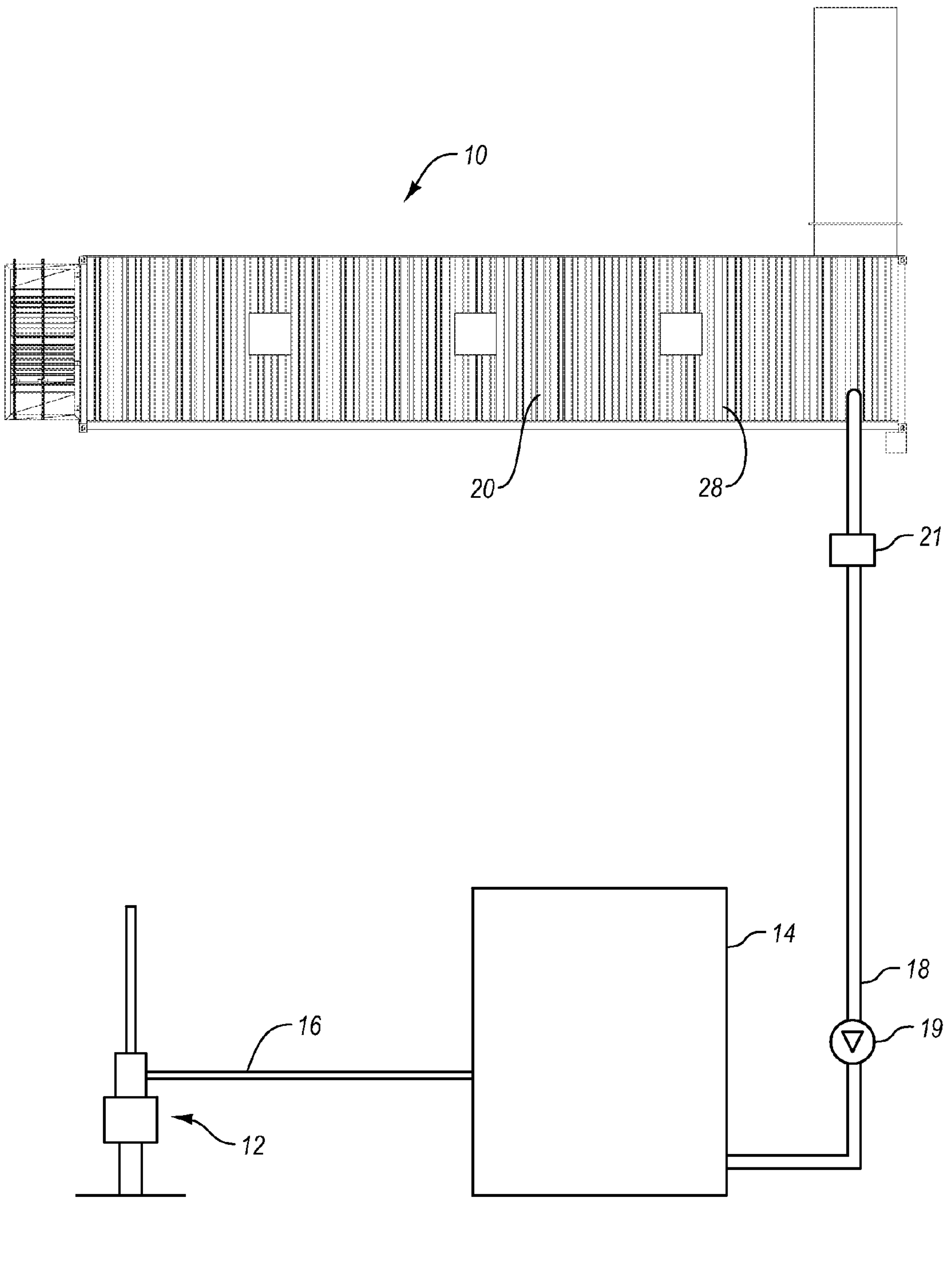
FIG. 1 is an elevated side view of one embodiment of an inventive water evaporation system that is fluid coupled with a well head and storage tank.

As illustrated in FIG. 1, water evaporation system 10 can be used in association with a well head 12. Well head 12 can be part of an oil or gas well. During production of the well, fluids such as water and oil are passed out of well head 12 and are delivered, either directly or indirectly, to a storage tank 14 through a pipe 16. Within storage tank 14, the water and oil separate with the oil rising to the top and the water settling to the bottom. A pipe 18 is then used to convey the water from storage tank 14 to water evaporation system 10. The water can be conveyed either under the force of gravity or by the use of a pump 19. As discussed below in greater detail, water evaporation system 10 is then used to evaporate the water and disperse it into the surrounding environment. If desired, a flow meter 21 can be mounted on pipe 18 so as to provide an exact measurement of how much fluid has been evaporated through water evaporation system 10.

It is appreciated that the water can be delivered to water evaporation system 10 using a variety of different methods. For example, in contrast to storage tank 14 being fluid coupled with a well head, the fluid can be delivered to storage tank 14 by truck, rail, or other transport mechanism. Furthermore, in contrast to water evaporation system 10 being coupled with storage tank 14, the water can be delivered to water evaporation system 10 directly from a settling pond or other type of container system. Likewise, the water can be delivered to water evaporation system 10 directly from a truck, rail car, or other type of vehicle.

Figure 2:
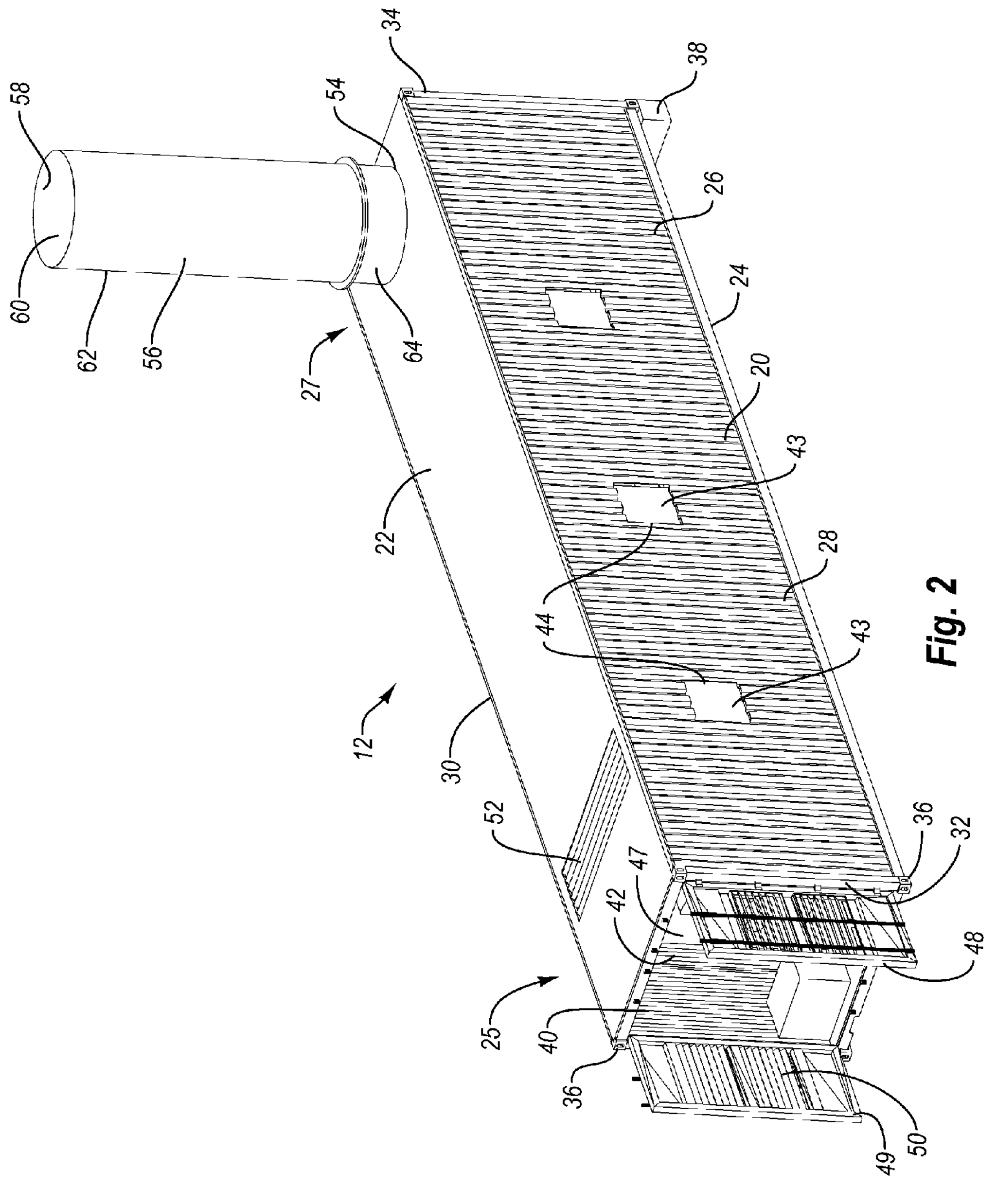
FIG. 2 is a front perspective view of the water evaporation system shown in FIG. 1.

Turning to FIG. 2, water evaporation system 10 comprises a housing 20 having a substantially parallelepiped configuration that includes a substantially flat roof 22 and an opposing floor 24 that each extend between a first end 25 and an opposing second end 27. An encircling sidewall 26 extends between roof 22 and floor 24. Encircling sidewall 26 includes a first sidewall 28 and an opposing second sidewall 30 that each extend between a first end wall 32 and an opposing second end wall 34. In the embodiment depicted, housing 20 is elongated with a central longitudinal axis extending between first end wall 32 and second end wall 34. In alternative embodiments, housing 20 need not be elongated. Likewise, housing 20 need not have a parallelepiped configuration. For example, roof 22 can be pitched as opposed to being flat. Hooking ports 36 are formed on a plurality of the corners of housing 20 and are typically formed on all eight corners of housing 20. Hooking ports 36 comprise small openings which can receive hooks, straps, or fasteners for lifting, transporting, or securing housing 20.

In one embodiment, housing 20 comprises a standard metal shipping container having standard dimensions that has been modified for the intended use of the present invention. For example, standard metal shipping containers intended for intercontinental use typically have external standard dimensions of length 20 feet (6.10 m), 30 feet (9.14 m), or 40 feet (12.20 m); width of 8 feet (2.44 m); and height of 8.5 feet (2.59 m) or 9.5 feet (2.90 m). These dimensions are only approximations and can vary within a few inches, such as within six inches (0.15 m). For example, the 30 feet containers are typically closer to 29.9375 feet (9.125 m) in length. Other standard and non-standard dimensions can also be used. In the illustrated example of the present invention, housing 20 has a length of 40 feet (12.20 m), a width of 8 feet (2.44 m), and height between 8.5 feet (2.59 m) to 9.5 feet (2.90 m) each within a tolerance of six inches (0.15 m).

By forming housing 20 out of standard shipping containers, housings 20 can be stacked, if desired, and easily transported by rail, ship, truck or the like using conventional techniques. In an alternative embodiment, housing 20 can be custom designed having other dimensions and configurations and can be made from other materials such as wood, plastic, fiberglass, composite, and the like.

Figure 3:
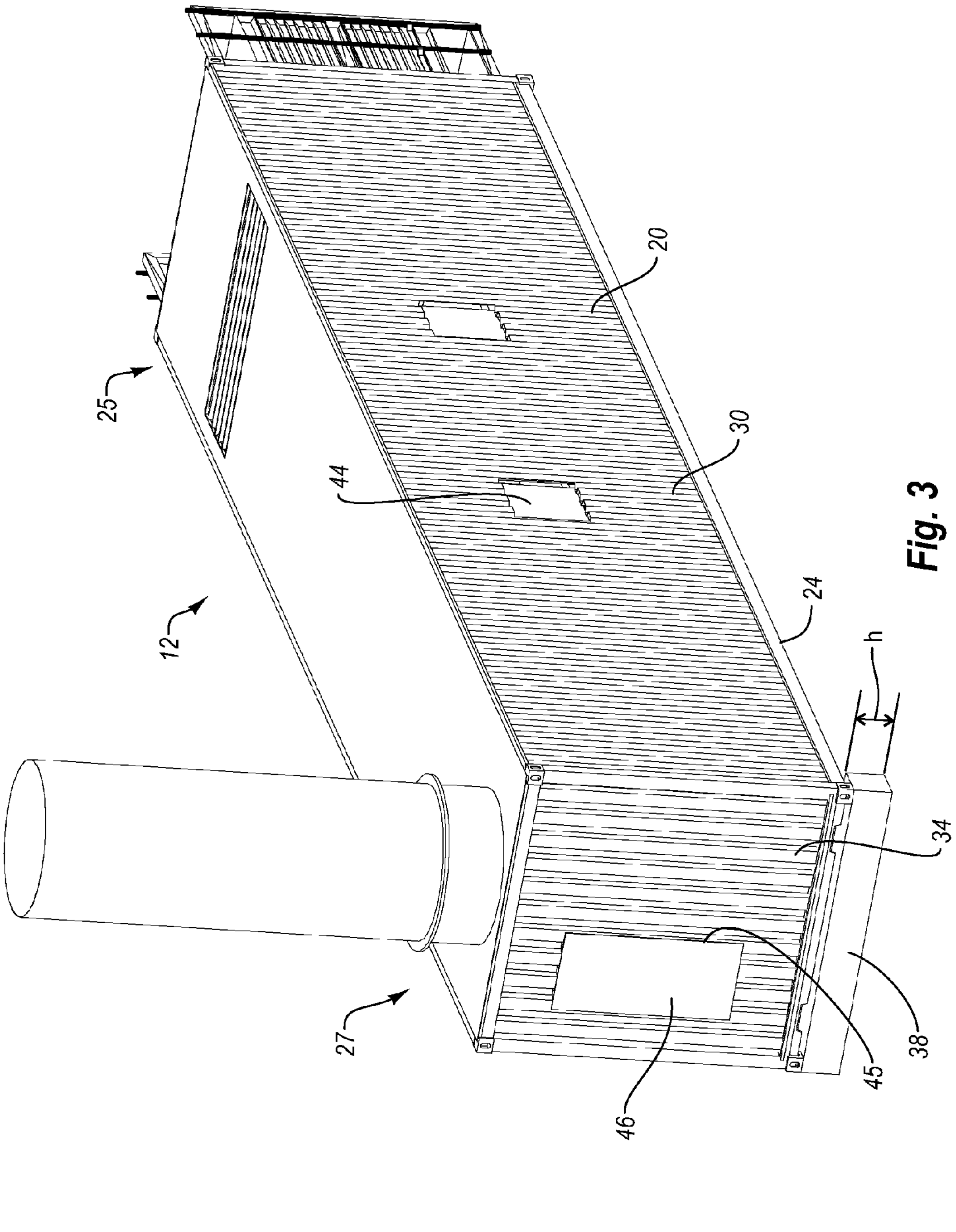
FIG. 3 is a rear perspective view of the water evaporation system shown in FIG. 1.

Depicted in FIGS. 2 and 3, a support 38 is mounted on floor 24 at second end 27 so as to downwardly project from floor 24. Support 38 typically has a height "h" in a range between about 15 cm to about 90 cm with about 20 cm to about 45 cm being more common. Other heights can also be used or support 38 can be eliminated. Support 38 can be mounted to housing 20 by welding, fasteners, or other conventional techniques. As will be discussed below in greater detail, support 38 functions to elevate second end 27 such that when housing 20 is disposed on a flat surface, floor 24 downwardly slopes from second end 27 to first end 25. In alternative embodiments, support 38 need not be directly mounted to floor 24 but can merely be positioned beneath floor 24 when positioning housing 20.

Figure 4:
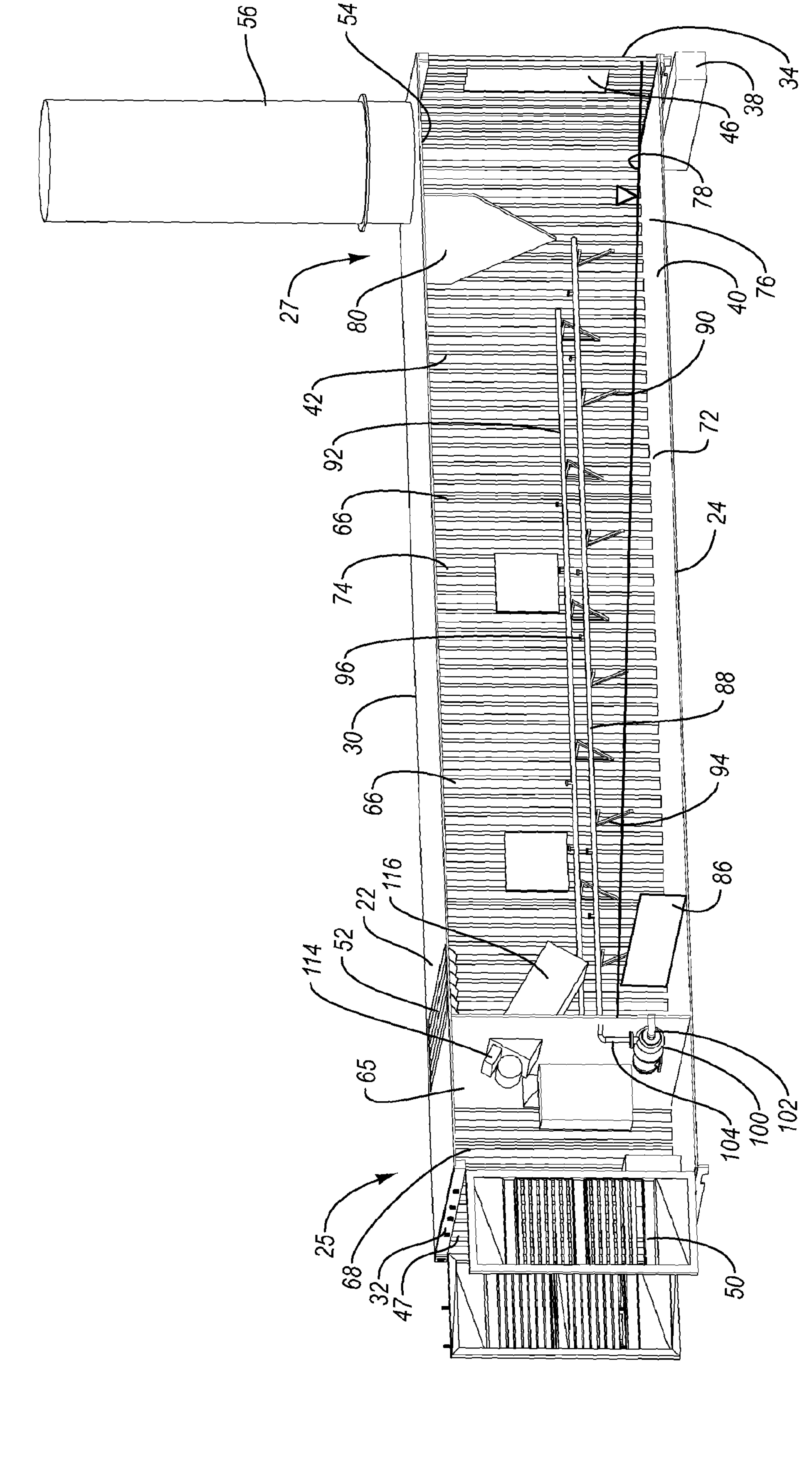
FIG. 4 is a cutaway front perspective view of the water evaporation system shown in FIG. 1.

As depicted in FIG. 4, housing 20 has an interior surface 40 that bounds a chamber 42. A partition wall 65 is disposed within chamber 42 at or towards first end 25 so as to divide chamber 42 into an evaporation chamber 66 disposed towards second end 27 and a storage chamber 68 disposed towards first end 25. Partition wall 65 typically extends from roof 22 to floor 24 and between opposing walls 28 and 30. However, partition wall 65 need not extend all the way to roof 22 and/or openings can be formed through partition wall 65.

As depicted in FIGS. 2 and 3, a plurality of spaced apart access ports 44 extend through a first sidewall 28 and second sidewall 30 so as to communicate with evaporation chamber 66. Access ports 44 are typically positioned at a height of at least about 1 meter above floor 24 (although other heights can also be used) and are sized to enable an individual to reach therethrough for accessing spray nozzles, as will be discussed below in greater detail, that are positioned within evaporation chamber 66. Each access port 44 can have a corresponding door 43 mounted on first sidewall 28 and second sidewall 30 for selectively closing and, if desired, locking access ports 44. Doors 43 can be hingedly, slidably, or removably mounted to the sidewalls. In alternative embodiments, it is appreciated that access ports 44 and doors 43 can be eliminated so that no openings are formed in the sidewalls.

As depicted in FIG. 3, a doorway 45 is formed on second end wall 34 to permit selective entrance into evaporation chamber 66. The bottom of doorway 45 is typically elevated a distance above floor 24 to help retain fluid within evaporation chamber 66. A door 46 can be hingedly mounted on second end wall 34 to permit selective closure of doorway 45. In alternative embodiments, doorway 45 can be eliminated and replaced with an access opening formed at some other location on housing 20.

With reference to FIG. 2, a doorway 47 can be formed on first end wall 32 for accessing storage chamber 68 at first end 25. A pair of opposing doors 48 and 49 are shown mounted on first end wall 32 for selectively closing doorway 47. Doors 48 and 49 have a plurality of slots 50 extending therethrough so that air can pass from the surrounding environment into storage chamber 68 by passing through slots 50. As will be discussed below in greater detail, it is desirable to have a fresh air inlet to storage chamber 68 so as to help control the temperature therein and to provide combustion air for a generator, furnace, and/or other mechanics that can be positioned within storage chamber 68. In alternative embodiments, slots 50 can be replaced with or supplemented by other openings formed in doors 48 and 49, first end wall 32, sidewalls 28 and 30 and/or roof 22 for providing air to storage chamber 68.

An inlet opening 52 extends through roof 22 so as to communicate with evaporation chamber 66 at first end 25 while an outlet opening 54 extends through roof 22 so as to communicate with evaporation chamber 66 at second end 27. As will be discussed below in greater detail, a tubular stack 56 is mounted on roof 22 so as to be disposed over outlet opening 54. Stack 56 has an interior surface 58 bounding a passage 60 extending between an upper end 62 and an opposing lower end 64. Stack 56 typically has a height extending between the opposing ends in a range between about 1 meter to about 30 meters with about 2 meters to about 5 meters being more common. Other lengths can also be used. In one embodiment, stack 56 can be hingedly mounted to roof 22 so that stack 56 can be selectively folded over to rest on top of roof 22 during transport of housing 10 and then folded upward and secured in position for final use.

Returning to FIG. 4, evaporation chamber 66 generally comprises a fluid reservoir 72 and an air flow path 74. More specifically, fluid reservoir 72 is bounded by floor 24 and the lower end of first sidewall 28, second sidewall 30, second end wall 34, and partition wall 65. These structural elements are secured together and are typically covered with a sealant so as to minimize rust and be substantially water tight. As a result, a fluid 76 can be pooled within fluid reservoir 72, the pool of fluid 76 having a top surface designated by a line 78. In alternative embodiments, various types of liners or one or more large containers can be positioned on or adjacent to floor 24 so as to form fluid reservoir 72.

As previously discussed with regard to FIG. 1, fluid 76 is delivered to fluid reservoir 72 thorough a pipe 18 fluid coupled with housing 20. It is again appreciated that fluid 76 can be delivered to fluid reservoir 72 in a variety of different ways such as through a hose, tube, pipe, or even through an opening in housing 20 through which fluid 76 is poured. It is also noted that fluid 76 can be delivered to fluid reservoir 72 through any surface of housing 20. In the embodiment depicted, fluid 76 is delivered to fluid reservoir 72 through first sidewall 28 at second end 27 of housing 20. As a result of support 38, floor 24 slopes downwardly toward partition wall 65. Accordingly, once fluid 76 enters fluid reservoir 72, fluid 76 flows down toward partition wall 65.

In one embodiment of the present invention, means are provided for filtering fluid 76. By way of example and not by limitation, a weir 86 upwardly projects from floor 24 and extends between opposing sidewalls 28 and 30. Weir 86 can be located at any position between partition wall 65 and second end wall 34 but is typically disposed closer to partition wall 65. Before reaching partition wall 65, fluid 76 must pass over weir 86. As a result, weir 86 helps to retains solids and other particulate matter on the upstream side of weir 86, thereby filtering fluid 76. In alternative embodiments, two or more spaced apart weirs can be formed on floor 24. One or more holes can be formed through the one or more weirs so that the fluid can pass therethrough but larger solids are preventing from passing therethrough. In still other embodiments, sections of screens or other filtering material can be positioned to extend between opposing sidewalls 28 and 30 so as to screen and thereby filter the fluid as is passes therethrough. Other conventional filtering techniques can also be used. Door 46 can be used to periodically access fluid reservoir 72 for cleaning out solids that have collected therein. In alternative embodiments, it is appreciated that support 38 can be eliminated and that floor 24 can be horizontally positioned. This is especially true where the fluid is filtered before entering fluid reservoir 72 or where filtering techniques other than weir 86 are used.

Air flow path 74 comprises the area within the evaporation chamber 66 that is vertically above fluid reservoir 72. Accordingly, from one perspective, the boundary between air flow path 74 and reservoir 72 can be top surface 78 of pooled fluid 76. That is, the area above top surface 78 is air flow path 74 while the area below top surface 78 is fluid reservoir 72. As top surface 78 raises within evaporation chamber 66, the volume of fluid reservoir 72 increases while the volume of air flow path 74 decreases.

With continued reference to FIG. 4, inlet opening 52 extends through roof 22 so as to communicate with first end 25 of evaporation chamber 66/air flow path 74 while outlet opening 54 extends through roof 22 so as to communicate with second end 27 of evaporation chamber 66/air flow path 74. A baffle 80 projects into air flow path 74 at a location between inlet opening 52 and outlet opening 54 so as to constrict the area of air flow path 74 thereat. In the embodiment depicted in FIG. 6, baffle 80 comprises a plate that downwardly projects from the interior surface of roof 22 so as to extend substantially orthogonal thereto. In alternative embodiments, baffle 80 can extend so as to form an inside angle between baffle 80 and roof 22 in a range between about 40° to about 140° with about 60° to about 120° being more common. Other angles can also be used. Baffle 80 can also be mounted to roof 22 by a hinge 83 so that baffle 80 can be selectively rotated out of the way for accessing evaporation chamber 66 or for positioning baffle 80 at a desired angle for controlling air flow past baffle 80.

Figure 6:
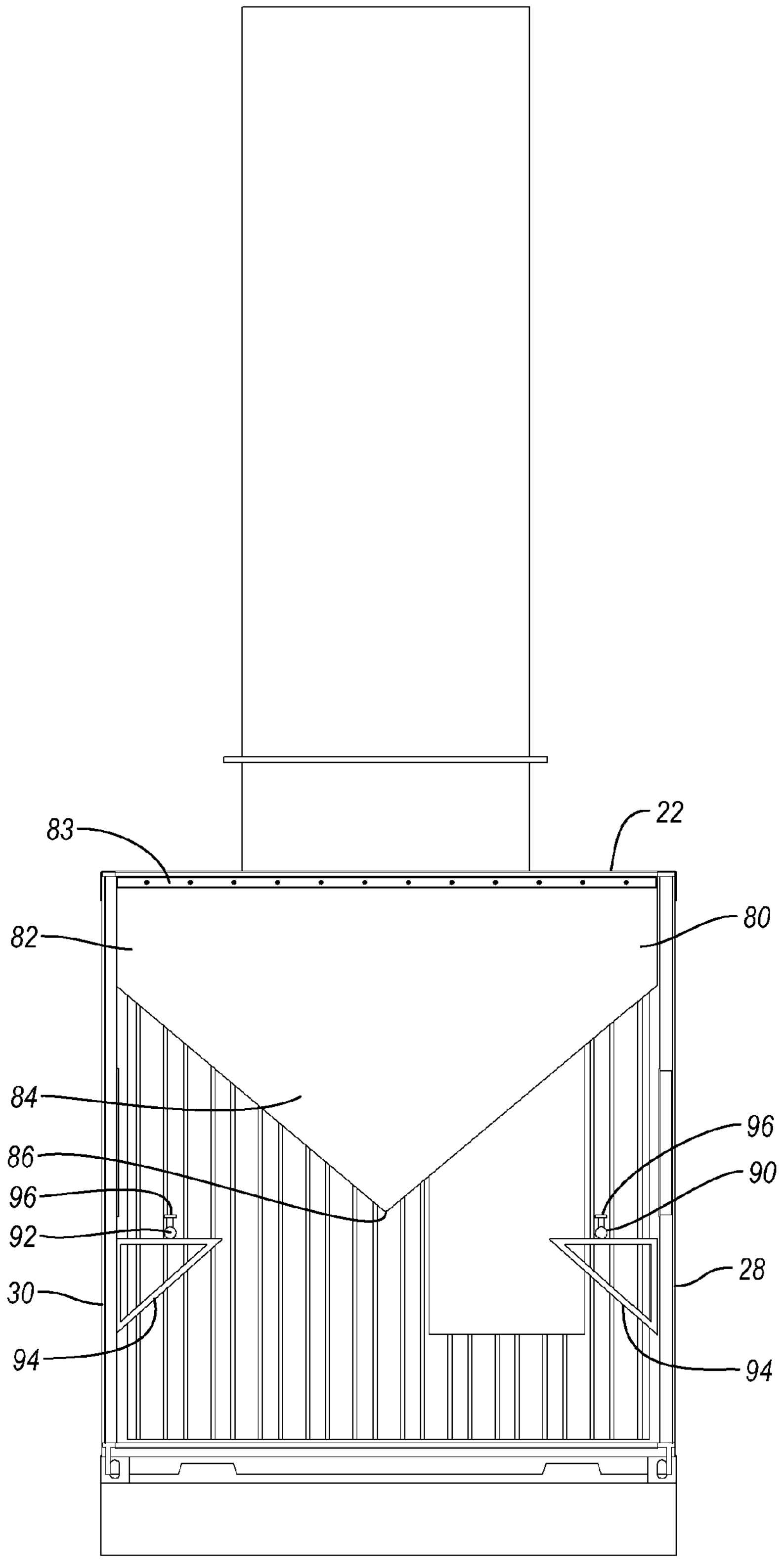
FIG. 6 is a cross sectional front view of the evaporation chamber of the water evaporation system shown in FIG. 1.
Figure 6A:
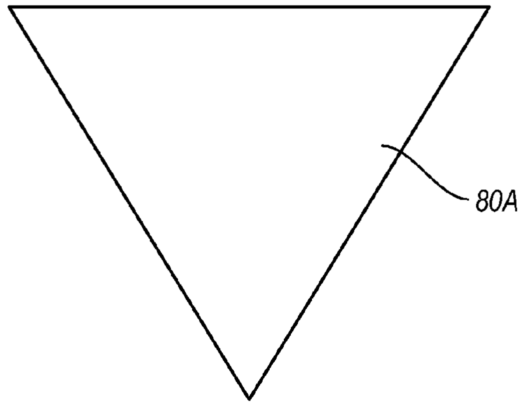
FIGS. 6A-6C are elevated front views of alternative embodiments of the baffle shown in FIG. 6.
Figure 6B:
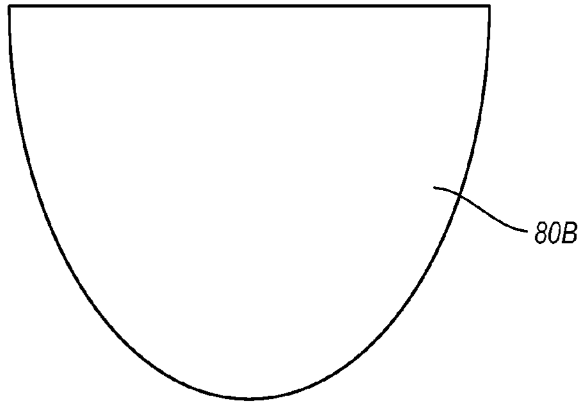
Figure 6C:
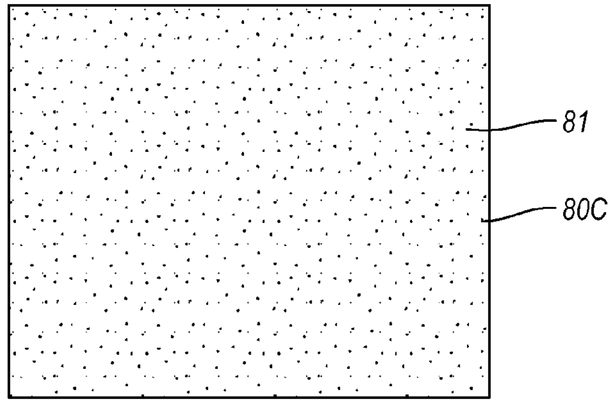

In the embodiment depicted baffle 80 has a substantially rectangular base portion 82 extending between opposing sidewalls 28 and 30 and a substantially triangular portion 84 that extends from base portion 82 down to an apex 86 that is centrally positioned between opposing sidewalls 28 and 30. It is appreciated that baffle 80 can come in a variety of different sizes, shapes, and configurations. By way of example and not by limitation, depicted in FIG. 6A is a baffle 80A having a substantially triangular configuration. Depicted in FIG. 6B is a baffle 80B having a semicircular or semielliptical configuration. Depicted in FIG. 6C is a baffle 80C having a substantially square or rectangular configuration. Baffle 80C can be positioned above top surface 78 of pooled fluid 76. Alternatively, baffle 80C or any of the other baffles can be formed from a porous material or have a plurality of openings 81 that extend therethrough so that the air and moisture can pass therethrough. In this embodiment, the baffle can extend down into pooled fluid 76. It is also noted that baffle 80 need not be a flat plate but can be contoured and/or can have a uniform or varied thickness.

Figure 5:
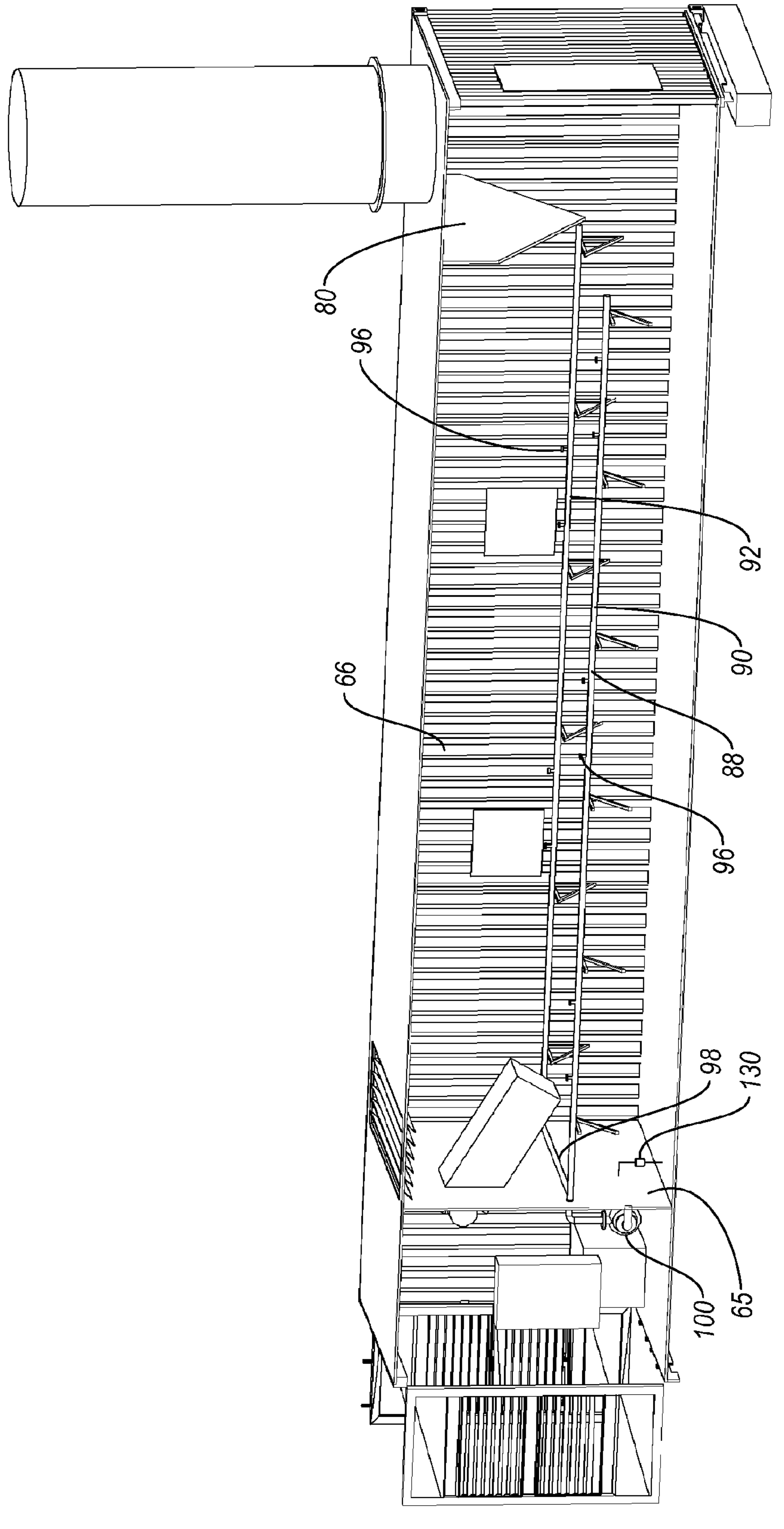
FIG. 5 is a cutaway rear perspective view of the water evaporation system shown in FIG. 1.

In one embodiment of the present invention, means are provided for regulating the level of fluid 76 within fluid reservoir 72. By way of example and not by limitation, a sensor 130 (FIG. 5) is mounted on partition wall 65 within evaporation chamber 66 and is electrically coupled with pump 19 (FIG. 1). In one embodiment, sensor 130 comprises a float sensor wherein when top surface 78 of pooled fluid 76 drops below a certain level, pump 19 is activated and fluid 76 is pumped into fluid reservoir 72. When top surface 78 of pooled fluid 76 reaches the desired level, sensor 130 turn pump 19 off. It is appreciated that sensor 130 can be positioned at any location that will enable it to sense the level of pooled fluid 76 and that sensor 130 can comprise any type of sensor, such an electrical eye, pressure sensor, or the like, that can determine the level of pooled fluid 76.

Returning to FIGS. 4 and 5, means are provided for spraying fluid 76 pooled within fluid reservoir 72 into air flow path 74 between baffle 80 and inlet opening 52. By way of example and not by limitation, piping 88 is disposed within evaporation chamber 66 and generally extends between partition wall 65 and baffle 80. More specifically, piping 88 comprises a first pipe section 90 that extends along the interior of first sidewall 28 while a second pipe section 92 extends along the interior of second sidewall 30. Both pipe sections generally extending between partition wall 65 and baffle 80 but can extend beyond baffle 80. As depicted in FIG. 6, brackets 94 are used to secure pipe sections 90 and 92 to their corresponding sidewalls so that the pipe sections are inwardly set a distance from the sidewalls. Longitudinally spaced along pipe sections 90 and 92 are a plurality of spray nozzles 96. Spray nozzles 96 are position and oriented so that fluid entering the pipe sections is outwardly and upwardly sprayed through spray nozzles 96. Returning to FIG. 5, a pipe section 98 extends between first and second pipe sections 90 and 92 so as to provide fluid communication therebetween.

Disposed within storage chamber 68 is a pump 100. As shown in FIG. 4, pump 100 has an inlet pipe 102 that extends through partition wall 65 so as to be in fluid communication with fluid reservoir 72. Pump 100 also has an outlet pipe 104 that extends through partition wall 65 so as to be in fluid communication with piping 88. During operation, pump 100 draws in fluid 76 from fluid reservoir 72 and pumps it out into piping 88. Fluid 76 exits piping 88 through spray nozzles 96 wherein fluid 76 sprays upwardly within air flow path 74 and then travels downward back into fluid reservoir 72 where the cycle then continues. To optimize spraying of fluid 76, spray nozzles 96 are positioned above top surface 78 of pooled fluid 76.

As will be discussed below in greater detail, at least a portion of fluid 76 sprayed within air flow path 74 evaporates and is removed out of air flow path 74. By having fluid 76 sprayed upward and then fall back down, the duration that the sprayed fluid 76 is suspended within air flow path 74 is maximized so as to maximize evaporation of fluid 76 within air flow path 74. In an alternative embodiment, fluid 76 can simply be sprayed down from roof 22.

It is appreciated that the means for spraying fluid 76 pooled within fluid reservoir 72 can have a variety of different configurations. By way of example and not by limitation, it is appreciated that piping 88 can be mounted on or below floor 24 and/or on or above roof 22. Elongated risers can then be used to position spray nozzles 96 at the desired position within air flow path 74. In contrast to having two pipe sections 90 and 92, it is appreciated that a single pipe section can be used that is either centrally positioned between or is positioned along one of the sidewalls. Alternatively, three or more spaced apart pipe sections can be used. It is likewise appreciated that the, type, size, configuration, number, orientation, and position of spray nozzles 96 can be dramatically varied. The general concept is to spray fluid 76 into air flow path 74 at a flow rate and concentration that will maximize the evaporation of fluid 76 within air flow path 74.

Figure 7:
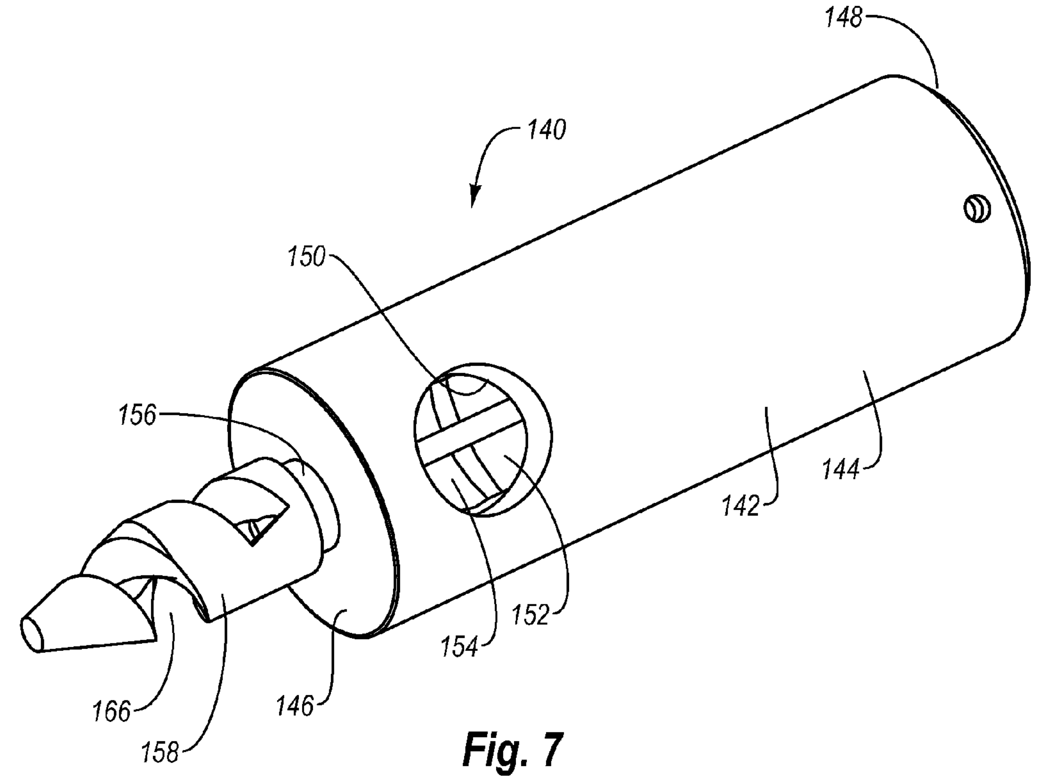
FIG. 7 is a perspective view of a self-cleaning nozzle.
Figure 8:
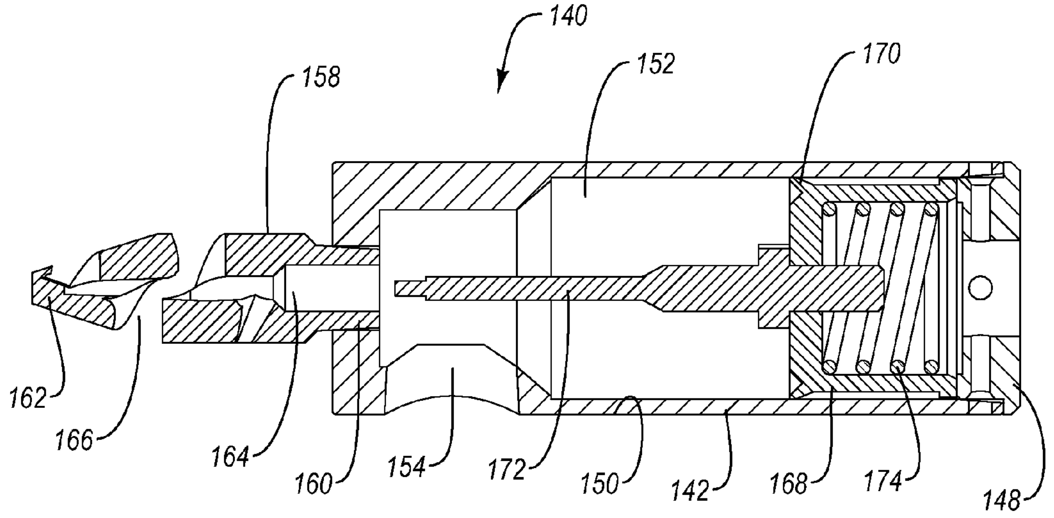
FIG. 8 is a cross sectional side view of the nozzle shown in FIG. 1 with the piston in a retracted position.

Depicted in FIG. 7 is one embodiment of a self-cleaning spray nozzle 140 that can be used for spay nozzles 96. Spray nozzle 140 comprises a housing 142 having a sidewall 144 extending between a first end wall 146 and an opposing second end wall 148. Housing 142 has an interior surface 150 that bounds a compartment 152. Communicating with compartment 152 through sidewall 144 is an inlet 154. An outlet 156 extends through first end wall 146 and also communicates with compartment 152. A nozzle head 158 is coupled with outlet 18 of housing 142. As depicted in FIG. 8, nozzle head 158 comprises a base 160 at one end and a tip 162 at the opposing end. A passage 164 extends through base 160 along a central longitudinal axis of nozzle head 158 toward tip 162. A slot 166 helically encircles and extends through the side of nozzle head 158 so as to communicate with passage 164. As a result, fluid traveling out of compartment 152 of housing 142 passes out through passage 164 and slot 166 of nozzle head 158.

Disposed within compartment 152 of housing 142 is a piston 168 that can selectively slide within compartment 152. An annular lip 170 is formed on piston 168 and effects a seal between piston 168 and interior surface 150 of housing 142. A spring 174, such as a coiled spring, is positioned between piston 168 and second end wall 149 and helps to facilitate movement of piston 168. A pin 172 is mounted on piston 168 in alignment with passage 164 formed on nozzle head 158. Piston 168 can selectively move between a retracted position and an advanced position. In the retracted position, as depicted in FIG. 8, spring 174 is longitudinally compressed and pin 172 is spaced apart from passage 164 of nozzle head 158 so that fluid can freely flow from compartment 152 out through passage 164.

Figure 9:
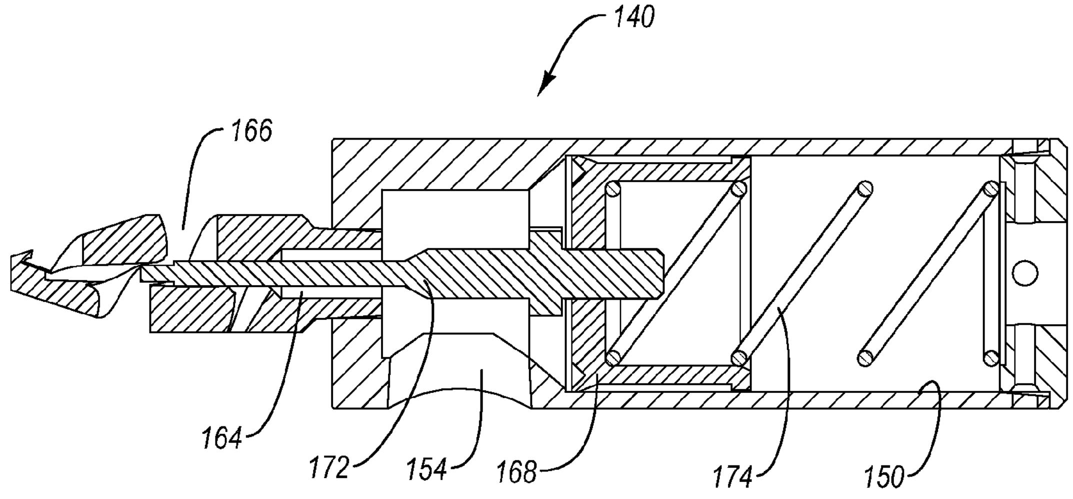
FIG. 9 is a cross section side view of the self-cleaning nozzle shown in FIG. 7 with the piston in an advanced position.

In the advanced position, as shown in FIG. 9, spring 174 advances piston 168 within compartment 152 so that pin 172 is advanced into passage 164 of nozzle head 158. In so doing, pin 172 pushes out any particulate material that may be collecting within passage 164 so as to clean nozzle head 158.

During use, piping 88 (FIG. 4) is fluid coupled with inlet 154 of housing 142. Fluid 76, pressurized by pump 100, is passed through piping 88 and into compartment 152. The fluid pressure within compartment 162 causes piston 168 to move backward to the retracted position as shown in FIG. 8, thereby compressing spring 174. With piston 168 in the retracted position, fluid 76 is free to travel out through nozzle head 158. When fluid 76 traveling through inlet 154 is turned off, the fluid pressure within compartment 152 decreases and spring 174 resiliently rebounds so as to push piston 168 forward into the advanced position as shown in FIG. 9. In so doing, pin 172 is advanced into nozzle head 158 so as to clean passage 164 thereof. When the fluid flow is turned on again, the process is repeated in that piston 168 is again moved to the retracted position as the fluid pressure increases within chamber 152. Accordingly, each time the fluid flow is turned on and off, pin 172 is used to automatically clean passage 164 of nozzle head 158.

Figure 10:
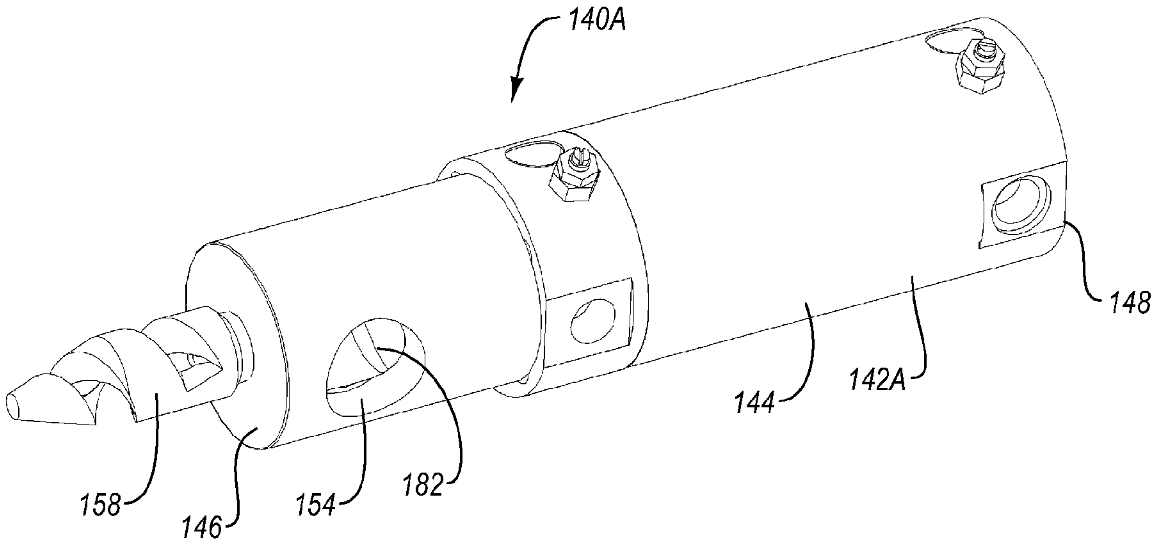
FIG. 10 is a perspective view of an alternative embodiment of the self-cleaning nozzle shown in FIG. 7.

In contrast to using spring 28 to help facilitate movement of piston 22, it is also appreciated that other mechanical means such as a solenoid or electric motor can be used to selectively facilitate movement of piston 22 between the advanced and retracted position. Likewise, piston 22 can by hydraulically or pneumatically operated. For example, depicted in FIG. 10 is an alternative embodiment of a spray nozzle 140A that can be hydraulically or pneumatically operated. Like elements between spray nozzle 140 and 104A are identified by like reference characters.

Figure 11:
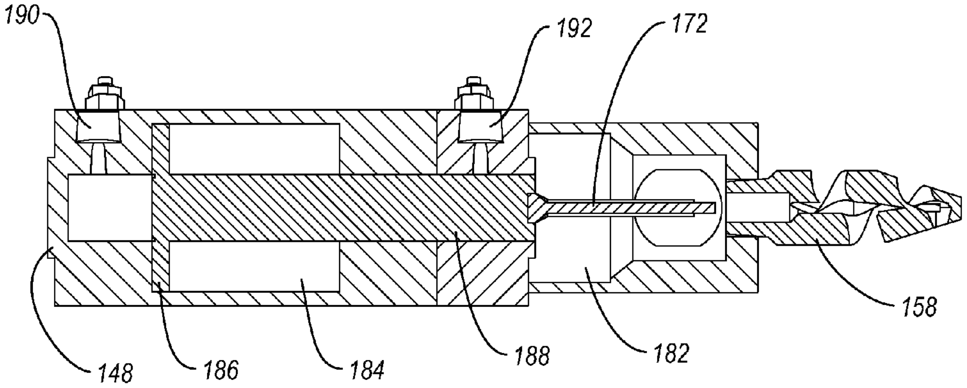
FIG. 11 is a cross sectional side view of the self-cleaning nozzle shown in FIG. 10 in a retracted position.
Figure 12:
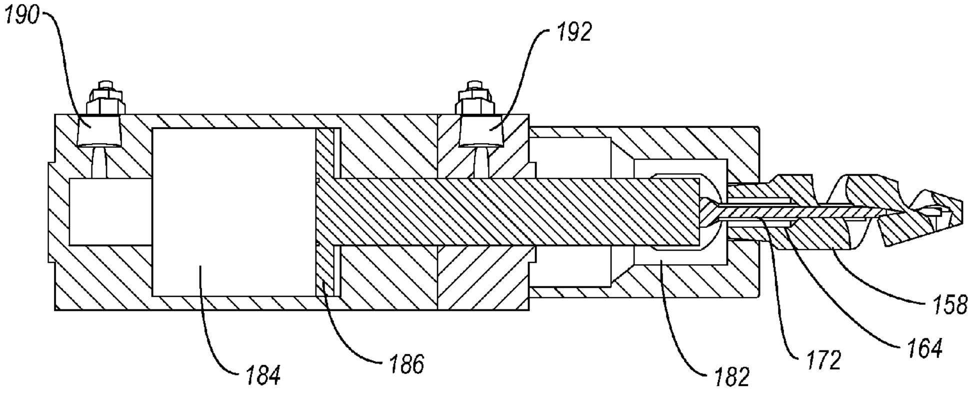
FIG. 12 is a cross sectional side view of the self-cleaning nozzle shown in FIG. 10 with the piston in an advanced position.

Spray nozzle 140A comprises a housing 142A that is similar to housing 142. The contrast, however, is that housing 142A comprises a first compartment 182 that communicates with inlet 154 and nozzle head 158 and a second compartment 184 that is spaced apart from first compartment 182. A piston 186 is slidably positioned within second compartment 184 while a shaft 188 extends from piston 186 to first compartment 182 where it couples with pin 172. A first port 190 communicates with compartment 184 at a location between second end wall 148 and piston 186. A line can be coupled with first port 190 for delivering a fluid or gas to compartment 184 which fluid or gas causes piston 186 to slide to the advanced position as shown in FIG. 12. Once the fluid or gas pressure is released from first port 190, fluid pressure within first compartment 182 drives piston 186 back to the retracted position shown in FIG. 11. A second port 192 communicating with second compartment 184 on the side of piston 186 opposite of first compartment 190 can also be used to deliver a fluid or gas to drive piston 186 back to the retracted position. As such, spray nozzle 140A can be used to selectively clean passage 164 of nozzle head 158 by selectively controlling the movement of piston 186. It is again noted that spray nozzle 96 need not be a self-cleaning nozzle but can be any conventional nozzle capable of spraying fluid 76 within air flow path 74.

Figure 13:
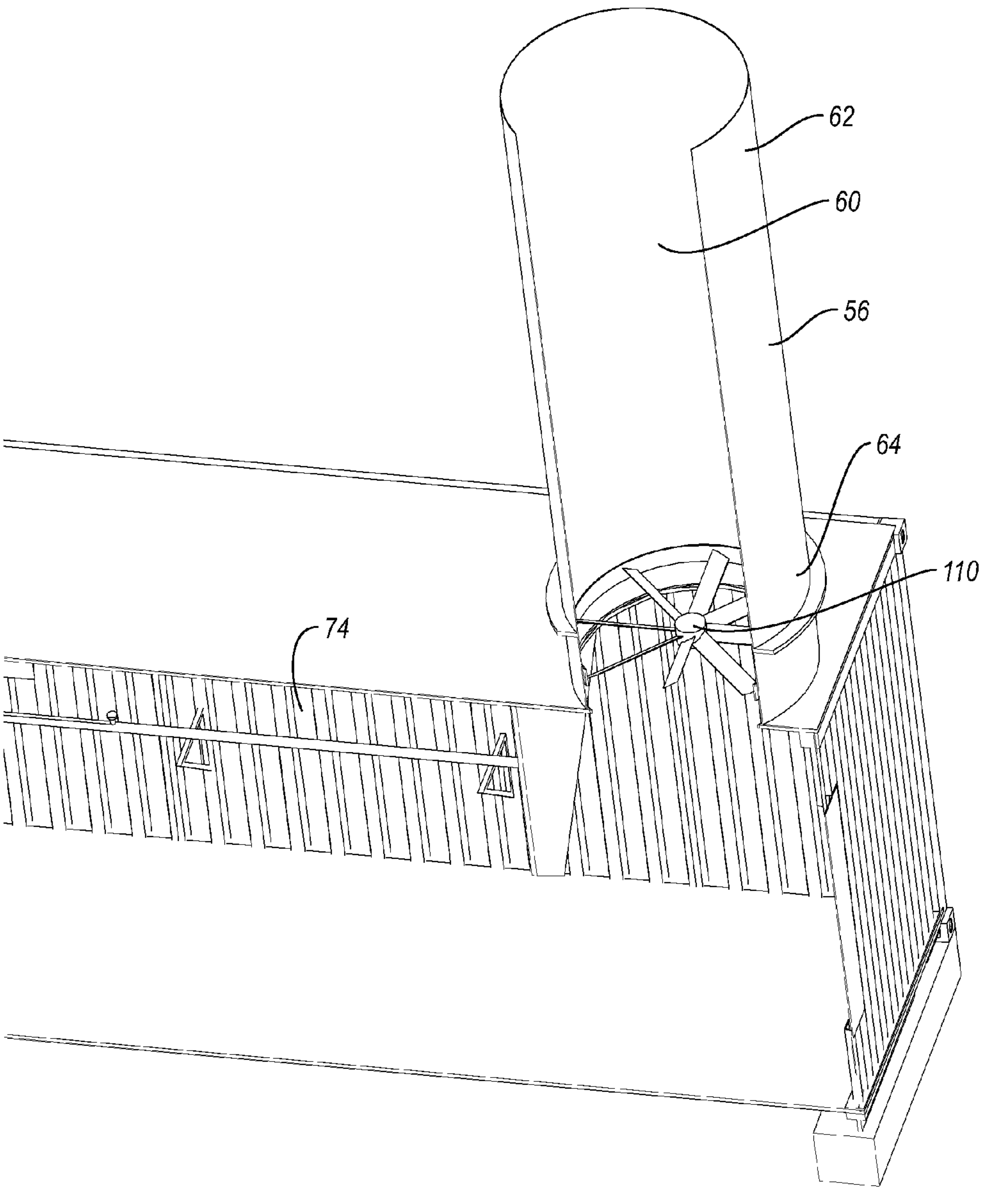
FIG. 13 is a partially cutaway perspective view of the water evaporation system shown in FIG. 1 depicting a fan disposed within the stack.

In one embodiment of the present invention, means are provided for drawing air from the surrounding environment into air flow path 74 through inlet opening 52 and for drawing the air out of air flow path 74 through outlet opening 54. By way of example and not by limitation, depicted in FIG. 13 is a fan 110 disposed within passage 60 of stack 56 at lower end 64 thereof. During operation, fan 110 draws air up and out of air flow path 74 which then passes through passageway 60 of stack 56 and then out into the surround environment. As air is drawn out of air flow path 74 by fan 110, a low pressure is created within air flow path 74 which causes air from the surrounding environment to be drawn into air flow path 74 through inlet opening 52, as shown in FIG. 4. As such, during operation of fan 110, air from the surrounding environment is continually being drawn from the surrounding environment into air flow path 74 through inlet opening 52. The air then travels along the length of air flow path 74 over top of fluid reservoir 72, passes around baffle 80, and then travels up and out to the surrounding environment through stack 56.

It is appreciated that a variety of different types of fans can be used within stack 56 or outlet opening 54 for drawing the air out of air flow path 74. In alternative embodiments, it is appreciated that a fan can be positioned at or adjacent to inlet opening 52 for drawing air into air flow path 74 or pushing air into airflow path 54. Likewise, in contrast to forming inlet opening 52 on roof 22, inlet opening 52 can also be formed on partition wall 65 and receive air through slot 50 or the alternatives thereto as previously discussed. Inlet opening 52 can also be formed on sidewall 28 or 30. Similarly, outlet opening 54 can be formed on sidewall 28 or 30 or end wall 34. In these embodiments, stack 56 would have a 90° elbow to connect with outlet opening 54.

During operation, a continuous flow of fresh air is drawn in from the environment and passed between inlet opening 52 and outlet opening 54 along air flow path 74. Spraying fluid 76 within air flow path 74 between inlet opening 52 and baffle 80 causes the air flow in that region to be highly turbulent. The combination of spraying fluid 76 in a fresh air stream that is highly turbulent and that is heated within air flow path 74 due to the ambient temperature and radiant energy striking housing 20 serves to optimize the evaporation of sprayed fluid 76 within air flow path 74.

Baffle 80 and stack 56 help to facilitate removal of non-evaporated water droplets from the air flow before the air flow exits stack 56 and travels back into the surrounding environment. This is to help ensure that water droplets do not simply pass out through stack 56 and then deposit on the ground surrounding housing 20. With regard to baffle 80, spray nozzles 96 typically do not extend past baffle 80 so that the air flow between baffle 80 and outlet opening 54 is less turbulent than between inlet opening 52 and baffle 80. Baffle 80 thus in part functions as a shield to help minimize the amount of sprayed fluid that is passed beyond baffle 80 and thus decrease air turbulence beyond baffle 80. Baffle 80 also partially constricts that area of air flow path 74 at the location of baffle 80. By constricting air flow path 74, the air flow becomes more laminar as it travels around baffle 80. Likewise, the air flow increases in speed as it travels through the area constricted by baffle 80 but then slows down as it expands into the larger space on the opposing side of baffle 80. As a result of producing a slower, less turbulent air flow, fluid droplets that are carried by the air flow but that have not yet evaporated, drop out of the air flow and back into fluid reservoir 72. Stack 56 provides added retention time for the air flow to help ensure that substantially all of the non-evaporated fluid droplets fall out of the air flow before the air flow exits stack 56. Furthermore, by being vertically oriented, the fluid droplets falling out of the air flow fall through the upcoming air flow so as to combine with and collect other fluid droplets.

On occasion, such as during the colder months of the year or during a short term cold period, the ambient temperature and radiant energy produced by the sun may not be sufficient to facilitate evaporation of fluid 76 at a desired rate. Accordingly, in one embodiment of the present invention, means are provided for blowing heated air into air flow path 74. By way of example and not by limitation, a furnace 114 is disposed within storage chamber 68. Furnace 114 comprises a heating element and a fan. A tubular vent 116 extends from furnace 114 through partition wall 65 into air flow path 72. Furnace 114 can be designed to operate on electricity, gasoline, natural gas and/or propane or other fuels. For example, natural gas from well head 12 can be used to operate furnace 114.

Figure 14:
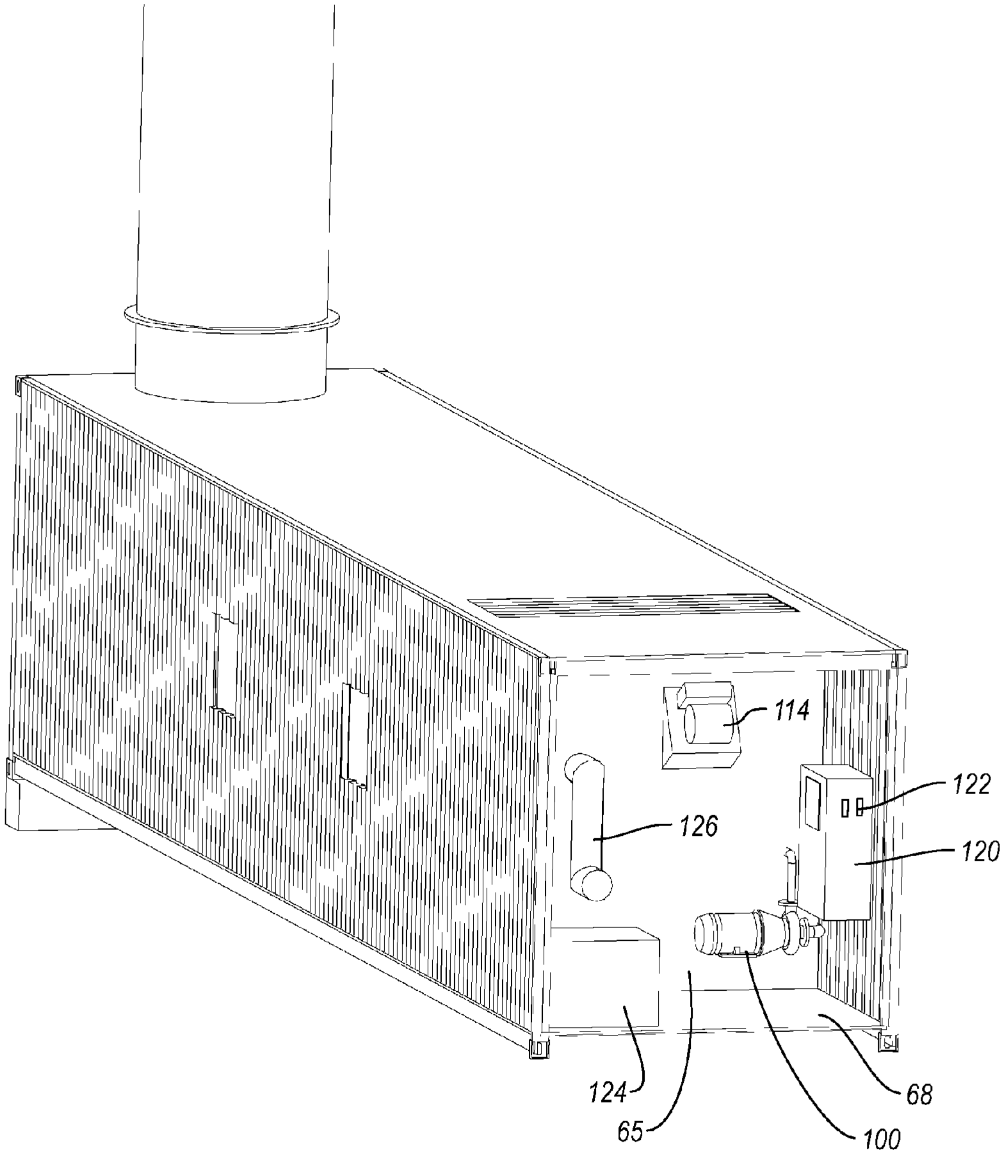
FIG. 14 is a perspective view of the storage compartment of the water evaporation system shown in FIG. 1.

Turning to FIG. 14, a central processing unit (CPU) 120 can be used to operate and selectively control various mechanics of water evaporation system 10. For example, CPU 120 is electrically coupled with sensors 122. Sensors 122 can comprise humidity sensors, temperature sensors, wind sensors, and other sensors that can be used in optimizing the operation of evaporation system 10. Sensors 122 can be positioned within storage chamber 68, outside of housing 20, and/or within evaporation chamber 66. Based on information such as the relative humidity and temperature, CPU 120 can selectively control the speed of fan 110, the flow rate of pump 100, and/or the operation of furnace 114. By selectively controlling and changing the operation of these mechanics, evaporation of fluid 76 can be optimized within evaporation chamber 66. For example, as the humidity in the surrounding environment increases, such as when raining, it may be necessary to slow down the speed of fan 110 and/or the flow rate of pump 100 so that water droplets are not passed out through stack 56. CPU 120 can also facilitate controlled operation of pumps 19 and 100, furnace 114, fluid level sensor 130 and fan 110.

Returning to FIG. 14, a generator 124 can be positioned within storage chamber 68. Generator 124 can be used to help facilitate operation of the various electrical components such as pumps 19 and 100, CPU 120, sensors 122 and 130, furnace 114, fan 110 and the like. A vent 126 extends through partition wall 65 to deliver exhaust from generator 124 to evaporation chamber 66 so as to help increase the temperature therein.

In view of the foregoing, it is appreciated that different embodiments of the present invention can be used to achieve a number benefits. For example, the water evaporation system can be designed to be transportable. As such, the water evaporation system can be shipped directly to a well head, storage tank, pond, or other site where it is desired to evaporate a fluid such as water. The water evaporation system thus eliminates the need to ship the fluid and eliminates the need to pay for disposal fees at a disposal facility. Once use of the system at one location is completed, the system can then be moved to another location. Likewise, if additional capacity is needed, two or more water evaporation systems can be positioned at a single site. In alternative embodiments, it is appreciated that the water evaporation system need not be transportable but can be built as a fixed structure at a desired location.

Additional benefits of the water evaporation system are that some embodiments can be designed to be self-contained for use in remote locations. Furthermore, because housing 20 is enclosed, the system can be used in high winds and in any other environmental conditions. In some embodiments, depending on whether conditions, it is appreciated that the water evaporation system can be used to evaporate more than 200 barrels of water per day and more commonly more than 300 or 400 barrels of water per day. Although the present invention is primarily discussed with the evaporation of water, it is also understood that the inventive water evaporation system can also be used for the evaporation of other types of fluids.

It is appreciated that the above discussion is only one embodiment of how water evaporation system 10 can be configured and that the various components can be moved around. For example, by making plumbing modification, it is appreciated that baffle 80 and stack 56 can be positioned toward partition wall 65 while inlet opening 52 and spray nozzles 96 are positioned toward second end wall 34. Other modifications can also be made. Thus, the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A fluid evaporation system comprising:

An elongated housing having a floor and a roof that each extend between a first end and an opposing second end and opposing sidewalls that extend between the floor and the roof along the length of the floor and the roof, the housing bounding a fluid reservoir formed at or adjacent to the floor in which a fluid is disposed, the fluid comprising wastewater from an oil or gas well, the housing also bounding an air flow path that is disposed between the fluid reservoir and the roof and that communicates with the fluid reservoir;

an inlet opening formed at the first end of the housing and communicating with the air flow path;

an outlet opening formed on the roof at the second end of the housing and communicating with the air flow path;

an elongated, tubular stack upwardly standing from the second end of the roof and communicating with the open environment outside of the housing, the tubular stack also communicating with the outlet opening so that the air passing out of the air flow path through the outlet opening passes upward through the stack and into the open environment, the stack and outlet opening being disposed above the fluid reservoir so that any fluid droplets that fall down within the stack collect within the fluid reservoir containing the wastewater from the oil or gas well, the stack having a height in a range of 2 meters to 5 meters above the roof;

a plurality of spray nozzles positioned within the air flow path between the inlet opening and the outlet opening at spaced apart locations along a length of the air flow path, the spray nozzles spraying the fluid from the fluid reservoir upward into the air flow path; and a furnace disposed at the first end of the housing and blowing heated air through the inlet opening so that the heated air passes over the fluid reservoir, through the sprayed fluid and out of the housing through the tubular stack.

2. The fluid evaporation system as recited in claim 1, wherein the housing comprises a standard shipping container comprised of metal and having a parallelepiped configuration.

3. The fluid evaporation system as recited in claim 2, wherein the shipping container has a width of approximately 8 feet, a length of approximately 30 feet or 40 feet, and a height of about 8.5 feet or about 9.5 feet, all dimensions being within a tolerance of six inches.

4. The fluid evaporation system as recited in claim 1, wherein the inlet opening and the outlet opening are each formed on the sidewall or the roof.

5. The fluid evaporation system as recited in claim 1, further comprising a weir positioned within the reservoir.

6. The fluid evaporation system as recited in claim 1, further comprising an elevating support positioned on the floor at the second end of the housing so that when the housing is positioned on a flat surface, the floor is sloped relative to the flat surface.

7. The fluid evaporation system as recited in claim 1, further comprising a baffle projecting into the air flow path at a location between the inlet opening and the outlet opening so as to constrict the area of the air flow path thereat.

8. The fluid evaporation system as recited in claim 7, wherein the baffle comprises a panel that is mounted to the roof or the sidewall.

9. The fluid evaporation system as recited in claim 7, wherein the baffle comprises a panel that is porous or has a plurality of openings extending therethrough.

10. The fluid evaporation system as recited in claim 1, wherein the elongated housing has a parallelepiped configuration.

11. The fluid evaporation system as recited in claim 1, wherein the elongated housing has a longitudinal axis that extends from the first end of the housing to the second end of the housing along the air flow path.

12. A fluid evaporation system comprising:

An elongated housing having a floor and a roof that each extend between a first end and an opposing second end and opposing sidewalls that extend between the floor and the roof along the length of the floor and the roof, the housing bounding a fluid reservoir formed at or adjacent to the floor in which a fluid is disposed, the fluid comprising wastewater from an oil or gas well, the housing also bounding an air flow path that is disposed between the fluid reservoir and the roof and that communicates with the fluid reservoir, the housing comprising a standard shipping container comprised of metal and having a parallelepiped configuration with a width of approximately 8 feet, a length of approximately 30 feet or 40 feet, and a height of about 8.5 feet or about 9.5 feet, all dimensions being within a tolerance of six inches;

an inlet opening formed at the first end of the housing and communicating with the air flow path;

an outlet opening formed on the roof at the second end of the housing and communicating with the air flow path;

an elongated, tubular stack upwardly standing from the second end of the roof and communicating with the open environment outside of the housing, the tubular stack also communicating with the outlet opening so that the air passing out of the air flow path through the outlet opening passes upward through the stack and into the open environment, the stack and outlet opening being disposed above the fluid reservoir so that any fluid droplets that fall down within the stack collect within the fluid reservoir containing the wastewater from the oil or gas well;

a plurality of spray nozzles positioned within the air flow path between the inlet opening and the outlet opening at spaced apart locations along a length of the air flow path, the spray nozzles spraying the fluid from the fluid reservoir upward into the air flow path; and a furnace disposed at the first end of the housing and blowing heated air through the inlet opening so that the heated air passes over the fluid reservoir, through the sprayed fluid and out of the housing through the tubular stack.

13. The fluid evaporation system as recited in claim 12, wherein the elongated housing has a longitudinal axis that extends from the first end of the housing to the second end of the housing along the air flow path.

14. A fluid evaporation system comprising:

An elongated housing having a floor and a roof that each extend between a first end and an opposing second end and opposing sidewalls that extend between the floor and the roof along the length of the floor and the roof, the housing bounding a fluid reservoir formed at or adjacent to the floor in which a fluid is disposed, the fluid comprising wastewater from an oil or gas well, the housing also bounding an air flow path that is disposed between the fluid reservoir and the roof and that communicates with the fluid reservoir;

an inlet opening formed at the first end of the housing and communicating with the air flow path;

an outlet opening formed on the roof at the second end of the housing and communicating with the air flow path;

an elongated, tubular stack upwardly standing from the second end of the roof and communicating with the open environment outside of the housing, the tubular stack also communicating with the outlet opening so that the air passing out of the air flow path through the outlet opening passes upward through the stack and into the open environment, the stack and outlet opening being disposed above the fluid reservoir so that any fluid droplets that fall down within the stack collect within the fluid reservoir containing the wastewater from the oil or gas well;

a plurality of spray nozzles positioned within the air flow path between the inlet opening and the outlet opening at spaced apart locations along a length of the air flow path, the spray nozzles spraying the fluid from the fluid reservoir upward into the air flow path;

a baffle projecting into the air flow path at a location between the inlet opening and the outlet opening so as to constrict the area of the air flow path thereat, the baffle comprises a panel that is mounted to the roof or the sidewall; and a furnace disposed at the first end of the housing and blowing heated air through the inlet opening so that the heated air passes over the fluid reservoir, through the sprayed fluid and out of the housing through the tubular stack.

15. The fluid evaporation system as recited in claim 14, wherein the baffle comprises a rigid panel that is hingedly mounted to the roof or the sidewall.

16. The fluid evaporation system as recited in claim 14, wherein there are no spray nozzles positioned within the air flow path between the baffle and the outlet opening.

17. The fluid evaporation system as recited in claim 14, wherein the spray nozzles are positioned between the baffle and the inlet opening.

18. A fluid evaporation system comprising:

An elongated housing having a floor and a roof that each extend between a first end and an opposing second end and opposing sidewalls that extend between the floor and the roof along the length of the floor and the roof, the housing bounding a fluid reservoir formed at or adjacent to the floor in which a fluid is disposed, the fluid comprising wastewater from an oil or gas well, the housing also bounding an air flow path that is disposed between the fluid reservoir and the roof and that communicates with the fluid reservoir;

an inlet opening formed at the first end of the housing and communicating with the air flow path;

an outlet opening formed on the roof at the second end of the housing and communicating with the air flow path;

an elongated, tubular stack upwardly standing from the second end of the roof and communicating with the open environment outside of the housing, the tubular stack also communicating with the outlet opening so that the air passing out of the air flow path through the outlet opening passes upward through the stack and into the open environment, the stack and outlet opening being disposed above the fluid reservoir so that any fluid droplets that fall down within the stack collect within the fluid reservoir containing the wastewater from the oil or gas well;

a plurality of spray nozzles positioned within the air flow path between the inlet opening and the outlet opening at spaced apart locations along a length of the air flow path, the spray nozzles spraying the fluid from the fluid reservoir upward into the air flow path;

a baffle projecting into the air flow path at a location between the inlet opening and the outlet opening so as to constrict the area of the air flow path thereat, the baffle comprising a panel that is porous or has a plurality of openings extending therethrough; and a furnace disposed at the first end of the housing and blowing heated air through the inlet opening so that the heated air passes over the fluid reservoir, through the sprayed fluid and out of the housing through the tubular stack.

19. The fluid evaporation system as recited in claim 18, wherein the baffle comprises a rigid panel that is hingedly mounted to the roof or the sidewall.

20. The fluid evaporation system as recited in claim 18, wherein the spray nozzles are positioned between the baffle and the inlet opening.

21. A method for evaporating a fluid, the method comprising:

pooling a fluid within a reservoir that is bounded by an elongated housing having a floor and a roof that each extend between a first end and an opposing second end and opposing sidewalls that extend between the floor and the roof along the length of the floor and the roof, the reservoir being formed at or adjacent to the floor in which a fluid is disposed, the fluid comprising wastewater from an oil or gas well, the housing also bounding an air flow path that is disposed between the fluid reservoir and the roof and that communicates with the fluid reservoir;

creating a flowing air stream wherein air in the environment outside of the housing flows into the air flow path through the air inlet opening formed at the first end of the housing and communicating with the air flow path, travels along the air flow path so that the air passes over the fluid within the reservoir, passes out of the housing through an outlet opening formed on the roof at the second end of the housing and communicating with the air flow path and then travels up through an elongated, tubular stack upwardly standing from the second end of the roof and communicating with the open environment outside of the housing, the tubular stack communicating with the outlet opening so that the air passing out of the air flow path through the outlet opening passes upward through the stack and into the open environment, the stack and outlet opening being disposed above the fluid reservoir so that any fluid droplets that fall down within the stack collect within the fluid reservoir containing the wastewater from the oil or gas well, the stack having a height in a range of 2 meters to 5 meters above the roof;

spraying the fluid within the reservoir through a plurality of spray nozzles positioned within the air flow path between the inlet opening and the outlet opening at spaced apart locations along a length of the air flow path, the spray nozzles spraying the fluid from the fluid reservoir upward into the air flow path; and blowing heated air through the inlet opening by a furnace disposed at the first end of the housing so that the heated air passes over the fluid reservoir, through the sprayed fluid and out of the housing through the tubular stack.

22. The method as recited in claim 21, further comprising fluid coupling the reservoir with a storage tank spaced apart from the tank, the storage tank housing a quantity of the fluid.

23. The method as recited in claim 21, further comprising fluid coupling the storage tank to a gas or oil well head, the fluid being delivered from the well head to the storage tank.

24. The method as recited in claim 21, further comprising regulating the speed of the flowing air stream based on the temperature or humidity within or outside of the housing.

* * * * *

UNITED STATES PATENT AND TRADEMARK OFFICE
CERTIFICATE OF CORRECTION

PATENT NO. : 8,460,509 B2
APPLICATION NO. : 12/029377
DATED : June 11, 2013
INVENTOR(S) : Lakatos et al.

It is certified that error appears in the above-identified patent and that said Letters Patent is hereby corrected as shown below:

On the Title Page
Substitute title page with attached title page showing an illustrative figure Title Page 2, Column 1
Line 25, change “2002/0178723” to --2008/0178723--

Drawings
Sheet 2, replace Figure 2 with the figure depicted below, wherein label 12 is changed to label 10

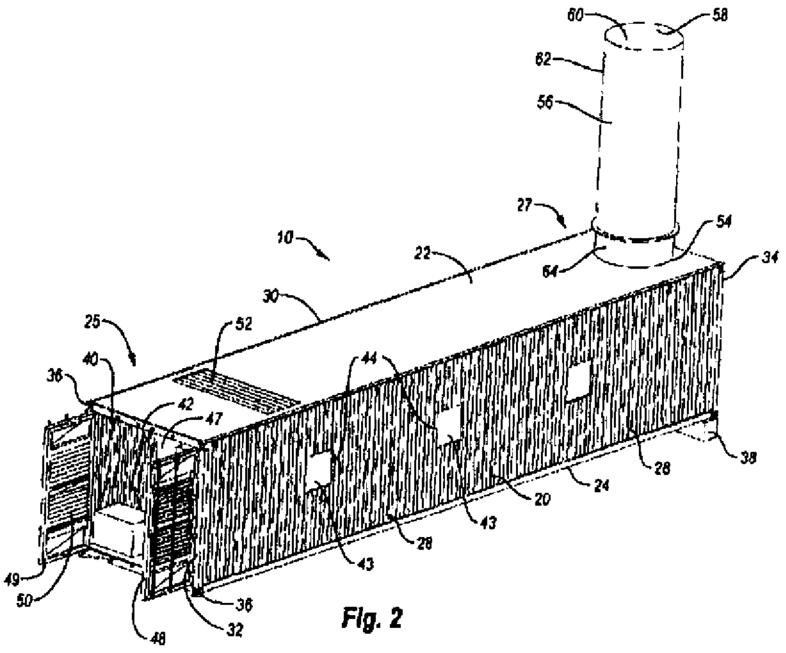

Fig. 2

Signed and Sealed this
Thirteenth Day of January, 2015

Michelle K. Lee
*Deputy Director of the United States Patent and Trademark Office*

Sheet 3, replace Figure 3 with the figure depicted below, wherein label 12 is changed to label 10
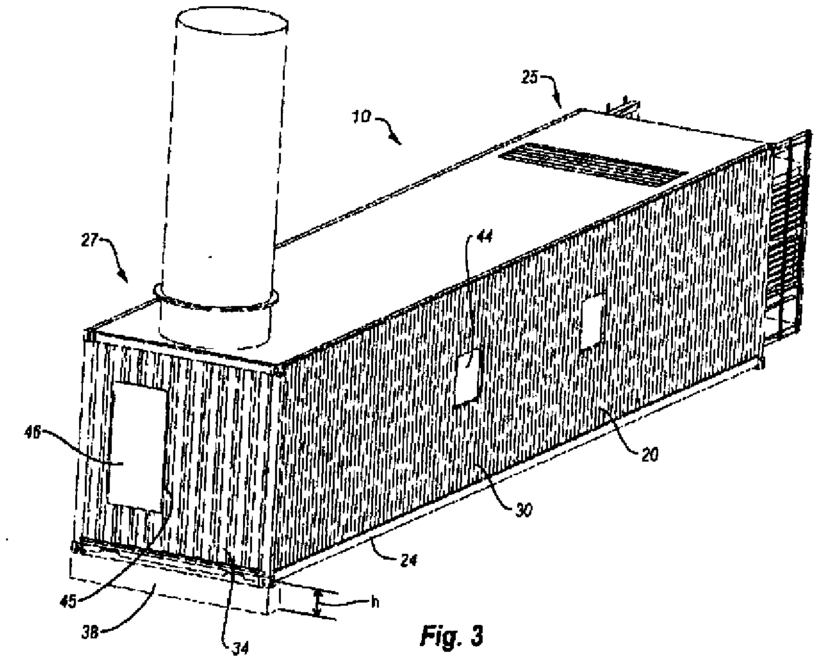
Fig. 3
Sheet 4, replace Figure 4 with the figure depicted below, wherein label 28 is added to the illustration
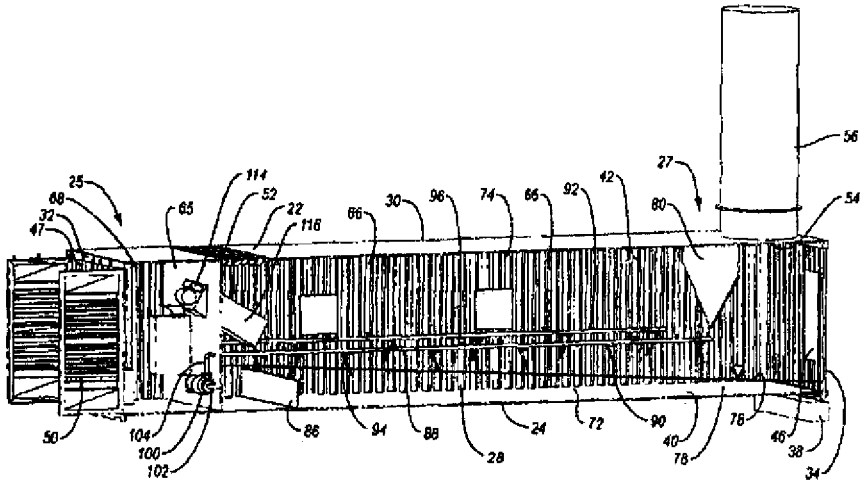
In the Specification
Column 5
Line 13, change “preventing from passing” to --prevented from passing--

Column 6
Line 16, change “turn pump 19” to --turns pump 19--

Column 7
Line 13, change “spay nozzles 96” to --spray nozzles 96--
Line 21, change “outlet 18” to --outlet 156--
Line 33, change “and effects a seal” to --and affects a seal--
Line 36, change “second end wall 149” to --second end wall 148--
Line 53, change “compartment 162” to --compartment 152--

Column 8
Line 1, change “spring 28” to --spring 174--
Line 2, change “piston 22” to --piston 168--
Line 5, change “piston 22” to --piston 168--
Line 9, change “104A” to --140A--
Line 29, change “first compartment 190” to --first compartment 182--

Column 9
Line 21, change “decrease” to --decreases--

Column 10
Line 32, change “whether conditions” to --weather conditions--
Line 43, change “plumbing modification” to --plumbing modifications--

(12) United States Patent
Lakatos et al.

(10) Patent No.: US 8,460,509 B2
(45) **Date of Patent: *Jun. 11, 2013**

(54) WATER EVAPORATION SYSTEM AND METHOD

(75) Inventors: Janos L Lakatos, Mendon, UT (US); Edward Clay Slade, North Logan, UT (US); Clayton R. Carter, North Logan, UT (US)

(73) Assignee: Total Water Management, LLC, Salt Lake City, UT (US)

( * ) Notice: Subject to any disclaimer, the term of this patent is extended or adjusted under 35 U.S.C. 154(b) by 750 days.

This patent is subject to a terminal disclaimer.

(21) Appl. No.: 12/029,377

(22) Filed: Feb. 11, 2008

(65) Prior Publication Data

US 2009/0199972 A1 Aug. 13, 2009

(51) Int. Cl.

| | |
|---|---|
| ***C02F 1/12*** | (2006.01) |
| ***B01D 1/14*** | (2006.01) |
| ***B01D 1/16*** | (2006.01) |

(52) U.S. Cl.

USPC .......... 159/47.3; 159/16.1; 159/38; 159/4.01; 159/41; 159/44; 159/48.1; 159/DIG. 15; 55/447; 202/166; 202/197; 202/236; 202/266; 202/267.1; 203/1; 203/10; 203/39; 203/49; 203/86; 203/88

(58) Field of Classification Search

USPC .................... 159/16.1, 38, 40, 41, 4.01, 4.02, 159/4.06, 44, 47.3, 48.1, DIG. 15; 55/447; 202/166, 197, 236, 266, 267.1; 203/1, 10, 203/39, 49, 86, 88

See application file for complete search history.

(56) References Cited

U.S. PATENT DOCUMENTS

| | | | | | |
|---|---|---|---|---|---|
| 1,502,911 | A | * | 7/1924 | Doern | 159/4.01 |
| 2,268,871 | A | * | 1/1942 | Hall | 159/4.07 |
| 2,825,680 | A | * | 3/1958 | Stutz | 202/200 |
| 3,703,917 | A | * | 11/1972 | Mundy | 83/867 |
| 3,771,289 | A | * | 11/1973 | Skoli et al. | 96/228 |
| 3,780,786 | A | * | 12/1973 | Pacault et al. | 159/4.02 |

(Continued)

FOREIGN PATENT DOCUMENTS

| | | |
|---|---|---|
| EP | 1 621 520 A1 | 2/2006 |
| JP | 6-218357 | 8/1994 |

(Continued)

OTHER PUBLICATIONS

International Search Report dated Aug. 12, 2011, issued in PCT/US2010/59941.

(Continued)

*Primary Examiner* — Virginia Manoharan
(74) *Attorney, Agent, or Firm* — Workman Nydegger

(57) ABSTRACT

A fluid evaporation system includes a housing bounding a fluid reservoir and an air flow path that is disposed over top of the fluid reservoir. The housing has an inlet opening and a spaced apart outlet opening that both provide communication between the outside environment and the air flow path. A fan is positioned to draw the air out of the air flow path through the outlet opening. A baffle projects into the air flow path at a location between inlet opening and the outlet opening so as to constrict the area of the air flow path thereat. A plurality of spray nozzles are positioned within air flow path between the baffle and the first end of the housing. A pump is configured to draw fluid from the reservoir and deliver it to the plurality of spray nozzles.

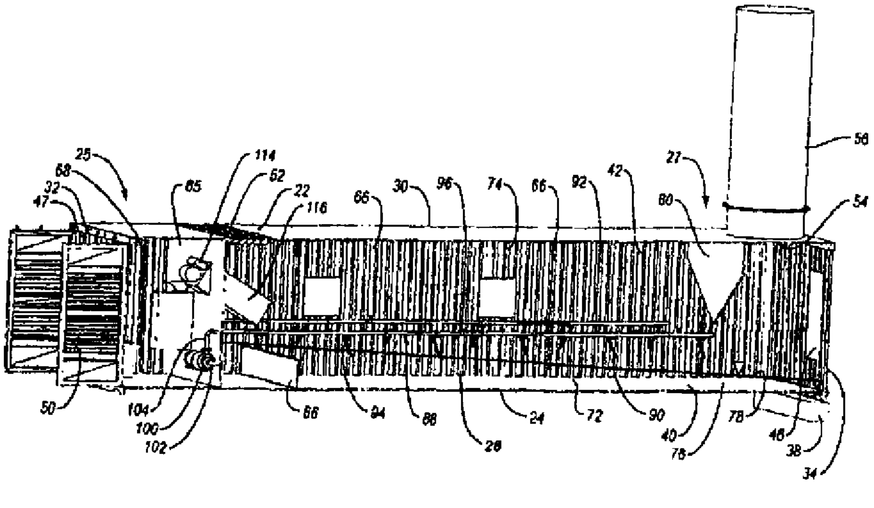

24 Claims, 12 Drawing Sheets